June 14, 1960
H. A. WHITE
2,940,621
POWER LOADER
Filed Dec. 23, 1957
2 Sheets-Sheet 1
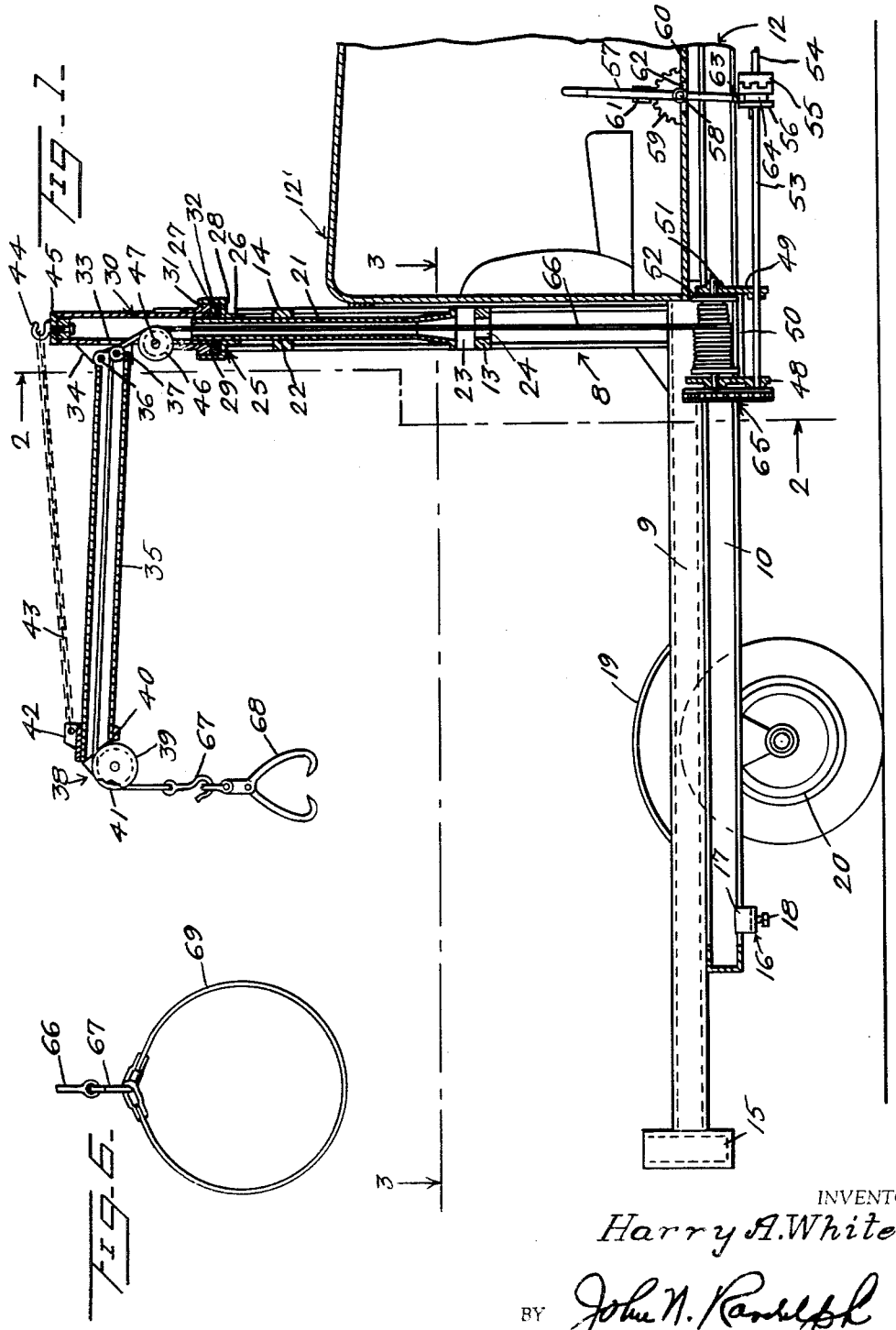
INVENTOR
Harry A. White
BY John N. Randolph
ATTORNEY

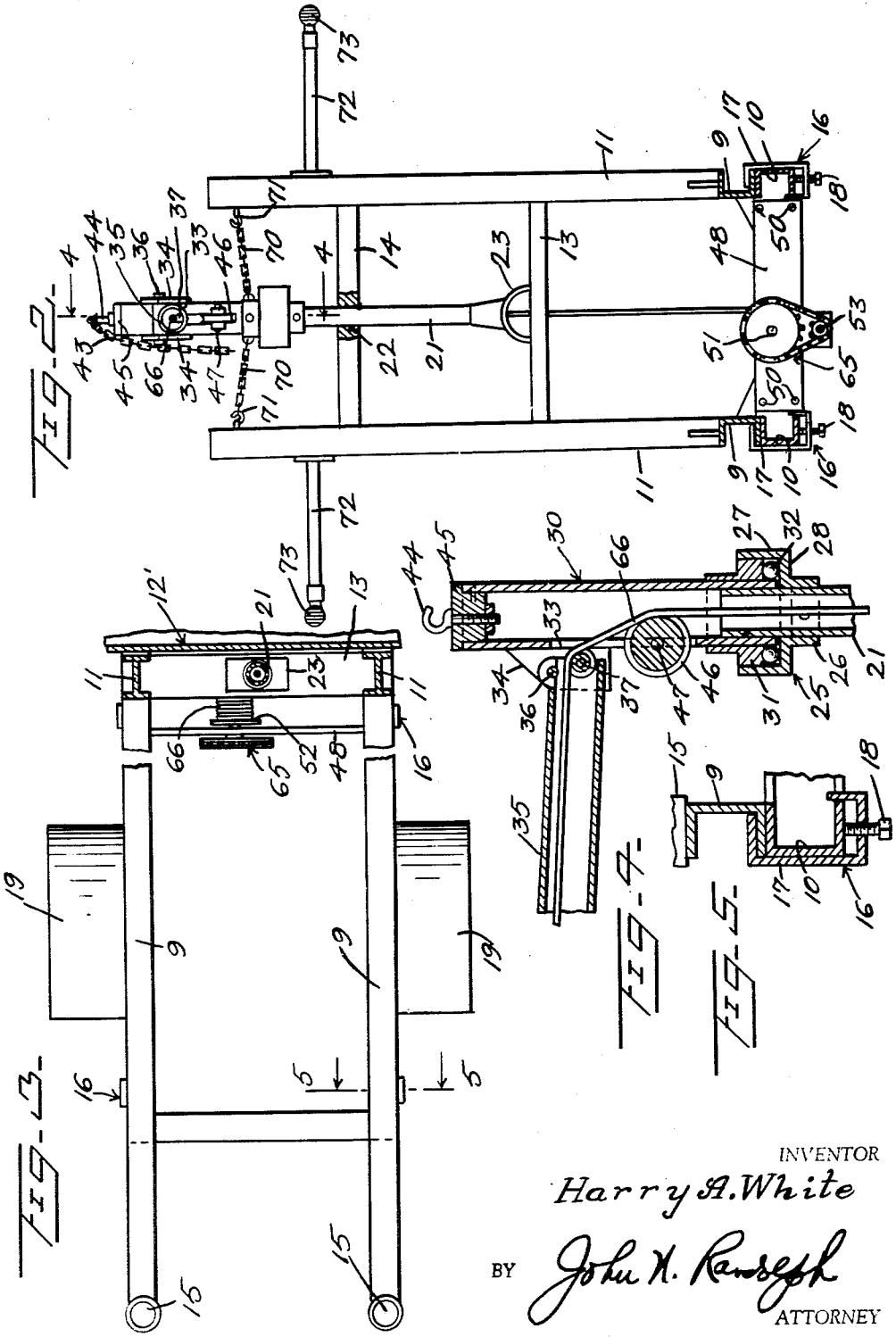

United States Patent Office 2,940,621
Patented June 14, 1960

2,940,621

POWER LOADER

Harry A. White, P.O. Box 845, Andrews, S.C.

Filed Dec. 23, 1957, Ser. No. 704,564

4 Claims. (Cl. 214—75)

This invention relates to a novel loading unit adapted to be mounted on a truck chassis and including a load supporting bed portion and conveying and hoist means for moving articles to be loaded toward either side of the truck for loading the articles on the bed portion of the unit.

Another object of the invention is to provide a loading unit of extremely simple construction which may be very economically manufactured and sold and which may be expeditiously employed with a chassis of a conventional truck.

Another object of the invention is to provide a loading unit especially adapted for handling wood and which may be efficiently employed for loading and unloading as well as for conveying the loaded wood.

Various other objects and advantages of the invention will hereinafter become more fully apparent from the following description of the drawings, illustrating a presently preferred embodiment thereof, and wherein:

Figure 1 is a fragmentary longitudinal sectional view of a portion of a truck with the power loader mounted thereon;

Figure 2 is a transverse vertical sectional view thereof taken substantially along a plane as indicated by the line 2—2 of Figure 1;

Figure 3 is a fragmentary horizontal sectional view taken substantially along a plane as indicated by the line 3—3 of Figure 1;

Figure 4 is an enlarged fragmentary vertical sectional view taken substantially along a plane as indicated by the line 4—4 of Figure 2;

Figure 5 is an enlarged transverse vertical sectional view, taken substantially along a plane as indicated by the line 5—5 of Figure 3, and Figure 6 is a fragmentary elevational view illustrating a slight modification of one part of the loader.

Referring more specifically to the drawings, the power loader in its entirely is designated generally 8 and includes a pair of spaced substantially parallel sill members 9 which are adapted to be detachably mounted on and supported by the longtiudinal side rails 10 of a self-propelled truck, a portion of which is illustrated in Figure 1 and designated generally 12. The sill members 9 preferably comprise outwardly opening channel members, as best seen in Figure 5. The loader also includes two uprights 11, which are preferably of I-shape in cross section as seen in Figure 3, which are fixed to and rise from forward ends of the sill members 9 and which are preferably disposed immediately behind a truck cab 12'. Said uprights 11 are rigidly connected to one another by a lower cross brace 13 and an upper cross brace 14. The sill members 9 are preferably of a length to extend beyond the rear end of the truck chassis when the forward ends of the sill members are disposed immediately behind the truck cab 12'. Upwardly opening socket members 15 are fixed to the rear ends of the sill members 9 and are adapted to detachably mount rear corner uprights, not shown, for maintaining a load, such as logs, not shown, on the sill members 9.

The loader 8 is detachably secured immovably on the truck 12 by a plurality of clamps 16 each of which includes a frame 17 which engages around one of the rails 10 and over a bottom part of the sill member 9 disposed thereabove, and a clamping screw 18 which is threaded through a bottom portion of the clamp frame 17 and is tightened against a bottom portion of the rail 10 to secure the clamp frame immovably to the rail 10 and sill member 9. At least two such clamp units 16 secure each sill member 9 to the rail 10 disposed therebeneath. Shields or fenders 19 are secured to and extend outwardly from the sill members 9 and are disposed over and spaced from the upper portions of the tires of the rear wheels 20 of the truck 12 to prevent any part of a load supported by the sill members 9 from coming in contact with said rear wheel tires.

A lower tubular mast section 21 extends through and is secured in a central opening 22 of the upper cross brace 14, as seen in Figure 2, and has an arch shaped base portion 23 at its lower end which rests upon and is secured to the lower cross brace 13 and so that the open lower end of the mast section 21 is disposed above and substantially in alignment with an opening 24 of the brace 13, as best seen in Figure 1. A collar 25 has a lower portion 26 disposed around and secured to the mast section 21 above the upper brace 14. The collar 25 has an enlarged upper end 27 which is disposed around and spaced outwardly from the upper end portion of the mast section 21 and which is connected to the lower collar portion 26 by an annular flange portion 28. The upper collar portion 27 and the flange portion 28 combine with the upper end portion of the mast section 21 to define an upwardly opening annular channel 29. An upper mast section 30 has an externally enlarged lower end 31 which fits turnably in the annular channel 29 and which is supported on ball bearings 32 which are mounted in the bottom of the channel 29 to permit free swiveling of the upper mast section 30 relative to the lower mast section 21.

The tubular upper mast section 30 is provided with a longitudinal slot 33 which is disposed above the collar 25. A pair of apertured ears 34 are secured to and extend laterally from the mast section 30 and straddle the upper end of the slot 33, as best seen in Figure 2. A tubular boom 35 has an inner end loosely disposed between the ears 34 and swingably connected thereto by a pivot pin 36 which extends transversely through the upper portion of the inner end of the boom 35 and through the ears 34 for supporting the boom for vertical swinging movement relative to the mast 21, 30. A small sheave 37 is journaled in the inner end of the boom 35 beneath and spaced from the pivot pin 36 and with its axis disposed parallel to the axis of said pivot pin.

A cap member 38 is mounted on the outer end of the boom 35 and has a downwardly opening outer portion 39 which is disposed beyond a recessed outer part 40 of the boom 35 in which a sheave 41 is journaled. The cap 38 has an upwardly projecting eye member 42 to which is secured one end of a chain 43. A cleat 44 is secured to and projects upwardly from a cap 45 which closes the upper end of the mast section 30. The cleat 44 is shaped to selectively engage a link of the chain 43 and to prevent slippage of the chain therethrough for supporting the boom 35 at different angles relative to the mast 21, 30. A third sheave 46 is supported by an axle 47 for rotation in the lower portion of the slot 33, beneath the inner end of the boom 35, and a part of the sheave 46 extends into the mast section 30 and terminates adjacent the longitudinal center thereof.

A plate 48 has end portions secured to the sill members 9 and extends therebetween and is downwardly offset relative to said sill members, as best seen in Figures 1 and 2. A second plate 49 is disposed forwardly of the plate 48 and is connected thereto by spacing rods 50. A shaft 51 extends through and is journaled in upper portions of the plates 48 and 49 and a reel 52 is fixed to said shaft and is disposed for rotation between the plates 48 and 49. The reel 52 is disposed almost directly beneath the opening 24 of the lower cross brace 13. A shaft 53 has a rear portion extending through and journaled in lower portions of the plates 48 and 49, beneath and spaced from the reel 52 and has a forward end spaced from and disposed in alignment with a rear end of a power takeoff takeoff shaft 54 which extends from and is driven by a prime mover, not shown, of the truck 12.

A clutch half 55 is fixed to the rear end of the power takeoff shaft 54 and a clutch half 56 is slidably keyed or splined to the forward end of the shaft 53. A lever 57 is pivotally connected at 58 intermediate of its ends to a semicircular latch segment 59 which is supported on the upper side of the floorboard 60 of the vehicle cab 12'. The upper portion of the lever 57 carries a conventional latch member 61 which normally engages between teeth of the latch segment 59 for immovably latching the lever 57. The lever 57 extends downwardly from its pivot 58 through an opening 62 of the floorboard 60 and has a yoke 63 at its lower end which loosely engages in an annular groove 64 of the clutch half 56. With the latch 61 released from the segment 59 the upper end of the lever 57 can be swung forwardly to displace the lower end thereof and the clutch half 56 rearwardly for disengaging the clutch halves and the shaft 53 from the shaft 54, and the lever 57 can be latched in a position with the clutch thus disengaged. Conversely, the upper end of the lever 57 can be swung rearwardly and latched in its position of Figure 1 with the clutch engaged so that the shaft 53 will be driven by and in unison with the shaft 54.

Sprocket wheels are fixed to the rear ends of the shafts 51 and 53 and an endless chain is trained over said sprocket wheels to form a chain and sprocket wheel drive between said shafts as seen in Figures 1 and 2 and designated 65, whereby the reel 52 will be driven simultaneously with the shaft 53. A cable 66 is wound on the reel 52 and has a free end extending upwardly therefrom through the opening 24, the hollow mast sections 21 and 30, outwardly through the boom 35 and downwardly from the cap member 38. Said cable end is trained over the sheaves 46, 37 and 41 by means of which the cable is supported out of contact with the brace 13, the mast and boom. A hook 67 is secured to the end of the cable which depends from the cap member 38 and a pair of tongs 68, as seen in Figure 1, or a sling 69, as seen in Figure 6, may be detachably connected to the hook 67 to engage wood or other items to be loaded onto the sills 9.

From the foregoing it will be readily apparent that the boom 35 can be raised or lowered by adjustment of the chain 43 in the cleat 44. With the clutches 55, 56 disengaged the end of the cable 66 to which the hook 67 is connected can be extended from the boom 35 and drawn laterally of the truck in either direction. The boom 35 can swing with the upper mast section 30 outwardly of either side of the truck 12 away from which the cable is extended. Wood or other articles, not shown, to be loaded can then be engaged by the tongs 68 or sling 69, which is attached to the hook 67 and pulled laterally toward the truck and thereafter lifted and deposited on the sills 9. For pulling and lifting items engaged by the tongs 68 or sling 69, the lever 57 is manipulated as heretofore described to engage the clutch halves so that the shaft 53 will be driven by the shaft 54 to turn the reel 52 in a direction for winding the cable thereon until the load is elevated to above the level of the sills 9 and above the level of other articles supported on said sills and so that the load can be manually swung to a position over the sills by a swivel movement of the upper mast section 30.

Chains 70 are attached to the upper mast section 30 and detachably engage hooks 71 which extend inwardly from the uprights 11 to retain the upper mast section and boom against swinging movement and with the boom disposed longitudinally of the truck 12 so that there will be no swinging movement of the boom 35 about the axis of the mast while the truck 11 is in transit.

The uprights 11 are also preferably provided with outwardly extending clearance arms 72 on the outer ends of which light bulbs 73 are mounted.

Various modifications and changes are contemplated and may be resorted to without departing from the function or scope of the invention as hereinafter defined by the appended claims.

I claim as my invention:

1. A power loader attachment for a motor truck comprising a pair of transversely spaced sill members adapted to be disposed longitudinally of a truck and resting on the side rails of the truck chassis, clamping means engaging spaced portions of the sill members and side rails for detachably securing the sill members to the side rails, uprights fixed to and rising from the forward ends of said sill members and adapted to be disposed behind and adjacent the truck cab, cross braces extending between and secured to said uprights, a tubular mast including a fixed lower section secured to and supported by said cross braces and an upper section rising from the upper end of said lower section, means swivelly supporting and mounting said upper mast section on the lower mast section, an elongated tubular boom connected to and extending laterally from said upper mast section and swingably movable therewith, a power winch disposed beneath said mast, means supported by said sill members and supporting said winch with the axis thereof parallel to the sill members, said winch including a cable having an end extending therefrom upwardly through the mast and outwardly through the boom and including a free end disposed beyond the outer end of said boom, load engaging means connected to said free end of the cable, and means adapted to couple said winch to a power takeoff shaft of the truck.

2. A power loader attachment as in claim 1, means pivotally connecting said boom to an intermediate portion of the upper mast section for vertical swinging movement of the boom relative to the mast, and means adjustably connecting the outer end of the boom to the upper end of the mast for supporting the boom at different angles relative to the mast.

3. A power loader attachment as in claim 2, and sheaves journaled in said mast and boom over which the cable is trained and by which the cable is maintained out of contact with the mast and boom.

4. A power loader attachment as in claim 1, and means detachably connecting the upper mast section to said uprights to prevent rotation of the upper mast section and boom relative to the lower mast section.

References Cited in the file of this patent

UNITED STATES PATENTS

| | | |
|---|---|---|
| 2,301,555 | Mantyla | Nov. 10, 1942 |
| 2,315,873 | Richards | Apr. 6, 1943 |
| 2,636,619 | Alexander | Apr. 28, 1953 |
| 2,799,402 | Norman | July 16, 1957 |
| 2,804,216 | Farnam | Aug. 27, 1957 |
| 2,821,311 | Screws | Jan. 28, 1958 |